United States Patent
Kataoka

(12) 
(10) Patent No.: US 10,723,220 B2
(45) Date of Patent: Jul. 28, 2020

(54) FUEL TANK SYSTEM

(71) Applicant: TOYOTA JIDOSHA KABUSHIKI KAISHA, Toyota-shi, Aichi-ken (JP)

(72) Inventor: Chiaki Kataoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 15/899,417

(22) Filed: Feb. 20, 2018

(65) Prior Publication Data

US 2018/0244147 A1 Aug. 30, 2018

(30) Foreign Application Priority Data

Feb. 28, 2017 (JP) .................... 2017-037222

(51) Int. Cl.
*B60K 15/035* (2006.01)
*B60K 15/04* (2006.01)
*B60K 15/01* (2006.01)
*B60K 15/03* (2006.01)

(52) U.S. Cl.
CPC ...... *B60K 15/035* (2013.01); *B60K 15/03504* (2013.01); *B60K 15/04* (2013.01); *B60K 2015/03105* (2013.01); *B60K 2015/03236* (2013.01); *B60K 2015/03243* (2013.01); *B60K 2015/03453* (2013.01); *B60K 2015/03514* (2013.01)

(58) Field of Classification Search
CPC .................. B60K 15/035; B60K 15/04; B60K 2015/03105; B60K 2015/03236; B60K 2015/03453

USPC ............................................... 220/562, 86.2
See application file for complete search history.

(56) References Cited

U.S. PATENT DOCUMENTS

| 5,912,368 A | 6/1999 | Satarino et al. |
| 2010/0178784 A1 | 7/2010 | Shimizu |
| 2012/0118159 A1* | 5/2012 | Kitamura ............. F02M 25/089 96/152 |
| 2013/0300628 A1* | 11/2013 | Liu ........................ H01Q 5/335 343/853 |
| 2015/0231964 A1* | 8/2015 | Sonderegger ........ B60K 15/035 55/332 |

(Continued)

FOREIGN PATENT DOCUMENTS

| JP | 2005-171947 A | 6/2005 |
| JP | 2008-94271 A | 4/2008 |

(Continued)

*Primary Examiner* — J. Gregory Pickett
*Assistant Examiner* — Niki M Eloshway
(74) *Attorney, Agent, or Firm* — Oliff PLC

(57) ABSTRACT

A fuel tank system includes: a fuel tank capable of storing fuel; a canister that has a ventilation port and an introduction port and that accommodates an adsorbent capable of adsorbing evaporative fuel introduced into the canister; a housing attached to the canister, and accommodating a pump configured to apply a pressure to an interior of the canister through the ventilation port; a pipeline that has an atmosphere opening port opening to an outside, the pipeline extending from the atmosphere opening port toward the ventilation port; and a filter unit having an internal space in which an air filter is arranged, the filter unit being removably fitted to the housing and the pipeline, the housing and the pipeline communicating with each other via the internal space.

3 Claims, 9 Drawing Sheets

(56) References Cited

U.S. PATENT DOCUMENTS

| | | | |
|---|---|---|---|
| 2016/0068062 A1* | 3/2016 | Aso | B60K 15/04 |
| | | | 220/86.2 |
| 2016/0186699 A1* | 6/2016 | Fukui | B60K 15/035 |
| | | | 123/520 |
| 2017/0051705 A1* | 2/2017 | Aso | B01D 53/04 |
| 2017/0304763 A1* | 10/2017 | Nelson | B01D 46/543 |

FOREIGN PATENT DOCUMENTS

| | | |
|---|---|---|
| JP | 2010-165784 A | 7/2010 |
| JP | 2015-71354 A | 4/2015 |

\* cited by examiner

FUEL TANK SYSTEM

INCORPORATION BY REFERENCE

The disclosure of Japanese Patent Application No. 2017-037222 filed on Feb. 28, 2017 including the specification, drawings and abstract is incorporated herein by reference in its entirety.

BACKGROUND

1. Technical Field

The disclosure relates to a fuel tank system.

2. Description of Related Art

According to an art disclosed in Japanese Patent Application Publication No. 2015-071354 (JP 2015-071354 A), an atmosphere opening port of an atmosphere communication pipe that leads to a canister is provided in the vicinity of a fuel feed port of an inlet pipe for feeding fuel to a fuel tank, and a filter unit having an air filter is fixed to this atmosphere opening port.

SUMMARY

By the way, according to the art disclosed in Japanese Patent Application Publication No. 2015-071354 (JP 2015-071354 A), the filter unit is fixed to the inlet pipe. Thus, when the air filter is replaced, the inlet pipe needs to be removed from a vehicle body. As a result, the operation of replacing the filter is complicated.

The disclosure provides a fuel tank system that makes it possible to easily replace an air filter.

An aspect of the disclosure provides a fuel tank system. The fuel tank system according to the aspect of the disclosure includes: a fuel tank capable of storing fuel; a canister that has a ventilation port and an introduction port and that accommodates an adsorbent, the adsorbent being capable of adsorbing evaporative fuel introduced into the canister from the fuel tank through the introduction port; a housing attached to the canister, the housing accommodating a pump configured to apply a pressure to an interior of the canister through the ventilation port; a pipeline that has an atmosphere opening port opening to an outside, the pipeline extending from the atmosphere opening port toward the ventilation port; and a filter unit having an internal space in which an air filter is arranged, the filter unit being removably fitted to the housing and the pipeline, the housing and the pipeline communicating with each other via the internal space.

In the fuel tank system according to the aforementioned aspect of the disclosure, an internal pressure can be applied to the canister and to the fuel tank that communicates with the housing via the canister, by driving the pump in the housing. The application of the internal pressure makes it possible to detect an abnormality (e.g., detect the opening of a hole) in the canister and the fuel tank.

Besides, in the aforementioned fuel tank system, the pump and the pipeline communicate with each other via the internal space of the filter unit. The air filter is arranged in the internal space of this filter unit. Therefore, foreign matters can be removed from the atmosphere that is introduced into the canister from the atmosphere opening port through the pipeline.

Also, in the aforementioned fuel tank system, the filter is removably fitted to the housing and the pipeline. In replacing the air filter, the used filter unit is separated (removed) from the housing and the pipeline, and a new filter is fitted (attached) to the housing and the pipeline. Thus, the air filter is replaced. It should be noted herein that the aforementioned fuel tank system makes it possible to more easily replace the air filter than in, for example, a configuration in which the filter unit is fixed (irremovably fitted) to another vehicle component (an inlet pipe), because only the filter unit can be independently separated (replaced).

In the above aspect, the filter unit may include a case inside which the air filter is arranged, a first tubular portion provided in the case, the first tubular portion establishing communication between the housing and the case by being inserted into an insertion portion provided through the housing, and a second tubular portion provided in the case, the second tubular portion establishing communication between the pipeline and the case by being inserted into an end portion of the pipeline.

In the aforementioned configuration, the case is provided with the first tubular portion that is inserted into the insertion portion of the housing, and the second tubular portion that is inserted into the end portion of the pipeline. Therefore, while ensuring a field in which the air filter is arranged, the case can be made smaller than in, for example, a configuration in which the case is provided respectively with a tubular portion provided through the housing and an insertion portion into which the end portion of the pipeline is inserted.

In the above aspect, the case may be provided with an engaging portion, and the housing may be provided with an engaged portion configured to be engaged with the engaging portion in a condition that the first tubular portion is inserted in the insertion portion.

In the aforementioned configuration, with the first tubular portion inserted in the insertion portion, the engaging portion of the case and the engaged portion of the housing are engaged with each other to limit the movement of the first tubular portion, namely, to fit the filter unit to the housing. It should be noted herein that the aforementioned fuel tank system makes it possible to easily fit the filter unit to the housing because the engaging portion and the engaged portion are engaged with each other by inserting the first tubular portion into the insertion portion.

In the above aspect, the engaging portion may be configured as a pair of protrusion portions that protrude in opposite directions from both lateral walls of the case, the lateral walls being opposed to each other, and the engaged portion may be configured as hole portions extending from the housing toward the case, the hole portions being provided through a pair of flexible plates sandwiching the case from both sides of the case, the hole portions allowing the protrusion portions to be inserted into the hole portions, respectively.

In the aforementioned configuration, when the case is attached to the housing, the case may be inserted into a space between the pair of the flexible plates and moved with the flexible plates pressed and flexed outward by the protrusion portions respectively. When the protrusion portions reach the hole portions of the flexible plates to be inserted into the hole portions respectively, the flexible plates return to their original states, the case is sandwiched from both sides thereof, and the filter unit is fitted to the housing. Besides, the filter unit is separated from the housing by taking out the case from the space between the pair of the flexible plates with the flexible plates flexed outward to cause the protrusion portions to slip out of the hole portions respectively. As described hitherto, the aforementioned fuel tank system makes it possible to easily attach/separate the filter unit and the housing to/from each other with a simple configuration in which the hole portions that are provided through the pair of the flexible plates of the housing and the protrusion portions that are provided on the case are used.

In the above aspect, the first tubular portion may be located above the second tubular portion in a vertical direction of a vehicle.

In the aforementioned configuration, the first tubular portion is located above the second tubular portion in the vertical direction of the vehicle. Thus, the liquid (water or the like) that has entered the interior of the pipeline from the atmosphere opening port can be temporarily stored in the case of the filter unit. Therefore, the aforementioned fuel tank system makes it possible to more effectively restrain the liquid that has entered the interior of the pipeline from the atmosphere opening port from flowing into the housing through the first tubular portion, than in, for example, a configuration in which the first tubular portion is located at the same position as the second tubular portion in the vertical direction of the vehicle or located below the second tubular portion with respect to the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
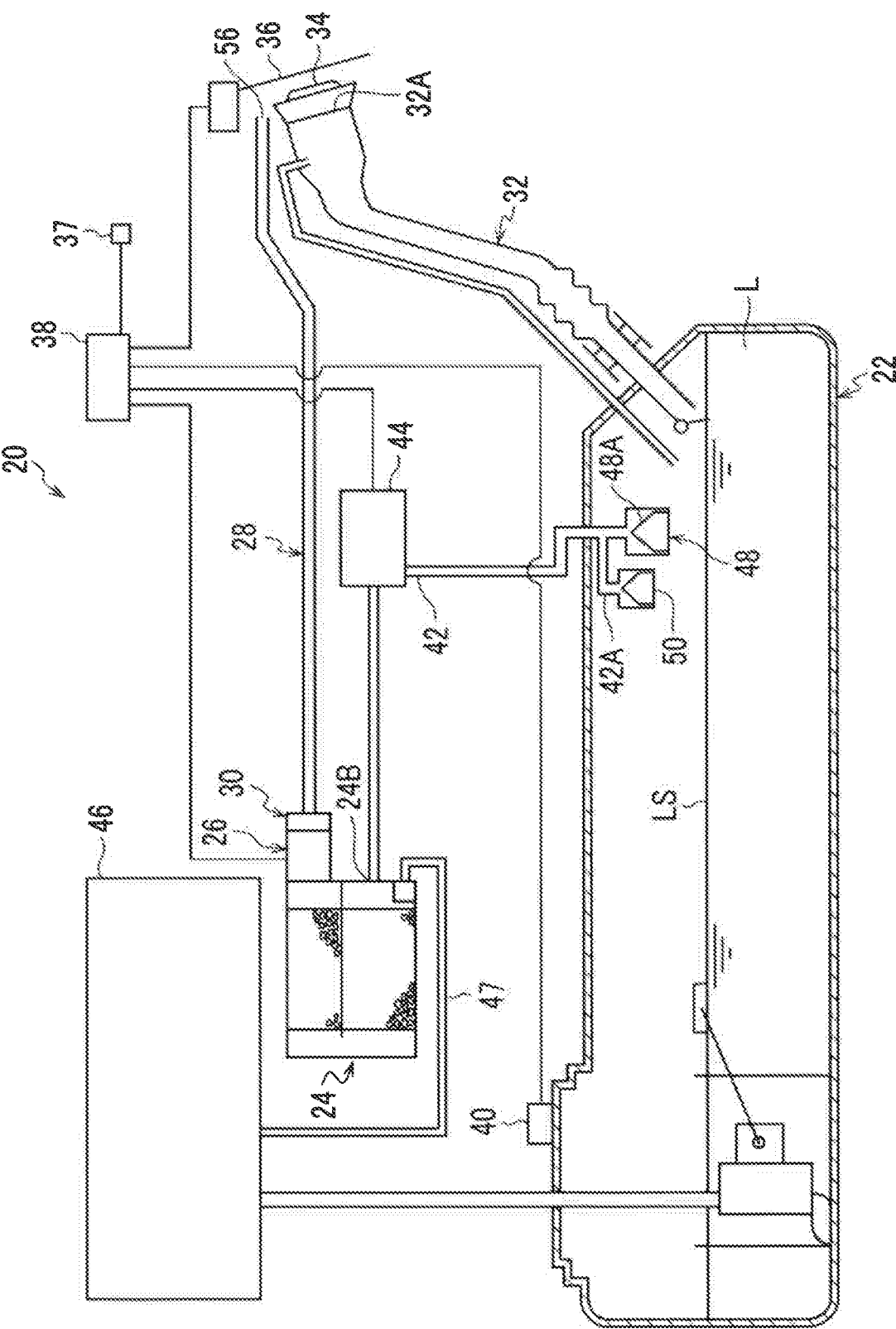
FIG. 1 is a view showing the general schematic configuration of a fuel tank system according to one of the embodiments of the disclosure.

One of the embodiments of a fuel tank system according to the disclosure will be described hereinafter. FIG. 1 shows a fuel tank system 20 according to the present embodiment of the disclosure.

(Fuel Tank System 20)

As shown in FIG. 1, the fuel tank system 20 is a system of a fuel tank that is mounted in a vehicle, and is equipped with a fuel tank 22, a canister 24, a housing 26A, an atmosphere communication pipe 28, and a filter unit 30. Incidentally, in the drawing, an arrow UP denotes an upward direction with respect to the vehicle.

(Fuel Tank 22)

The fuel tank 22 is a tank that is mounted in the vehicle and that can store fuel for vehicle use. As shown in FIG. 1, a lower-end region of an inlet pipe 32 is connected to an upper portion of this fuel tank 22. An upper-end opening region of this inlet pipe 32 serves as a fuel feed port 32A. By inserting a fuel feed gun of a fuel feed device (not shown) into this fuel feed port 32A, fuel can be fed to the fuel tank 22. Besides, the fuel feed port 32A is closed up by a fuel cap 34.

A panel of a vehicle body is further provided with a fuel lid 36 outside the fuel cap 34. For example, when information indicating that a lid opening switch 37 that is provided in a vehicle interior or the like has been operated is sent to a control unit (an ECU) 38, this fuel lid 36 is opened by the control unit 38.

The fuel tank 22 is provided with an internal pressure sensor 40. Information on a tank internal pressure detected by the internal pressure sensor 40 is sent to the control unit 38.

(Canister 24)

Figure 5:
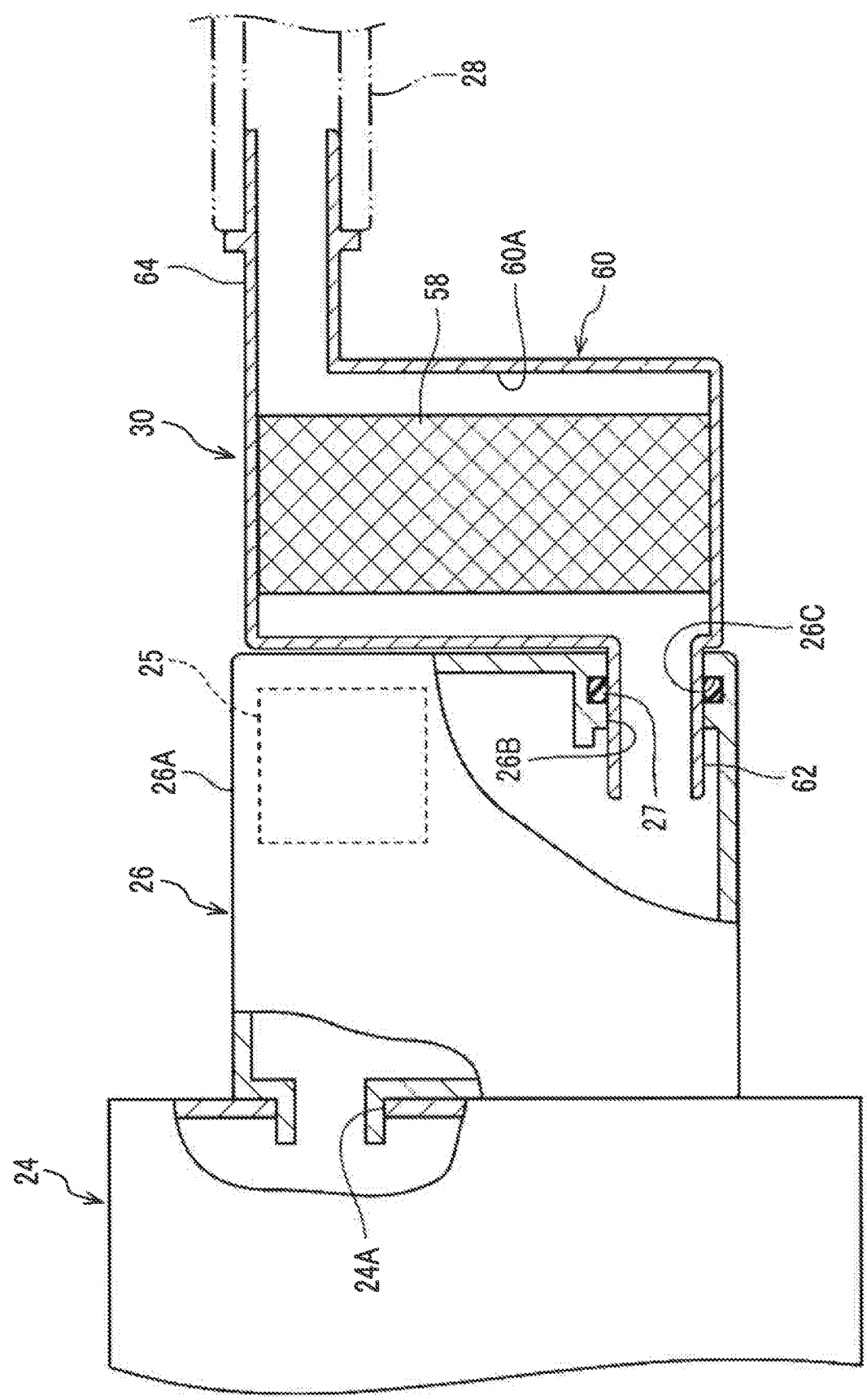
FIG. 5 is a cross-sectional view taken along a line V-V of FIG. 2.

The canister 24 is arranged outside the fuel tank 22. An adsorbent such as activated carbon or the like is accommodated inside this canister 24. Besides, the canister 24 has a ventilation port 24A (see FIG. 5) and an introduction port 24B (see FIG. 1). This introduction port 24B and an upper portion of the fuel tank 22 communicate with each other through a pipeline 42. Therefore, a gas in the fuel tank 22 (a gas containing evaporative fuel) can move to the canister 24 through the pipeline 42 and the introduction port 24B. The evaporative fuel in the gas that has moved to the canister 24 is adsorbed by the adsorbent in the canister 24, and the other gases (atmospheric components) are discharged to the atmosphere from the atmosphere communication pipe 28 that will be described later in detail. Incidentally, "the evaporative fuel" mentioned herein means gasified fuel.

The pipeline 42 is provided with a blocking valve 44 (e.g., an electromagnetic valve in the present embodiment of the disclosure) at a non-end portion thereof. This blocking valve 44 is controlled to be opened/closed by the control unit 38. When the blocking valve 44 is open, the gas in the fuel tank 22 can move to the canister 24 through the pipeline 42. When the blocking valve 44 is closed, this gas cannot move through the pipeline 42.

The canister 24 communicates with an intake passage (an intake manifold) (not shown) of an engine 46 through a pipeline 47. By applying a negative pressure of the engine 46 to the canister 24 with the blocking valve 44 closed, the atmosphere can be introduced from the atmosphere communication pipe 28, and the evaporative fuel adsorbed by the adsorbent can be desorbed (purged). The desorbed evaporative fuel is sent to the engine 46 to be burned.

Besides, a fill-up preventing valve 48 that is provided with a float-shaped valve body 48A is provided at a lower end of the pipeline 42. Even in the case where a liquid level LS of a fuel L rises when this fuel L is fed to the fuel tank 22, the valve body 48A does not close up the pipeline 42 until the liquid level LS reaches the fill-up preventing valve 48. Therefore, the fuel is not prevented from being fed. When the liquid level LS reaches the fill-up preventing valve 48 and the valve body 48A floats on the fuel to close up the pipeline 42, the gas in the fuel tank 22 cannot move to the canister 24.

A branch pipeline 42A is configured to branch off from the vicinity of a lower end portion of the pipeline 42 in the fuel tank 22. The branch pipeline 42A is provided with a cutoff valve 50 at a lower end thereof. The cutoff valve 50 is provided at a higher position than the fill-up preventing valve 48 in the fuel tank 22. When the tank internal pressure of the fuel tank 22 rises to exceed a predetermined value, this cutoff valve 50 is opened to allow the gas in the fuel tank 22 to flow into the canister 24. For example, even when the fill-up preventing valve 48 is closed, the gas in the fuel tank 22 can be moved to the canister 24, through the opening of the cutoff valve 50. Thus, the tank internal pressure of the fuel tank 22 is restrained from rising excessively.

(Housing 26A)

The housing 26A is attached to the ventilation port 24A side of the canister 24. A key-off pump 25 (an example of the pump in the disclosure) and a changeover valve (not shown) that establishes/cancels communication between the ventilation port 24A and a filter case 60 are accommodated in this housing 26A. This key-off pump 25 (see FIG. 5) applies a pressure to the interior of the canister 24 through the ventilation port 24A. In concrete terms, the key-off pump 25 applies an internal pressure to the fuel tank 22 that is connected to the canister 24, via the canister 24 and the pipeline 42. The driving of the key-off pump 25 is controlled by the control unit 38. In the present embodiment of the disclosure, an internal pressure (a positive pressure in the present embodiment of the disclosure) can be applied to the canister 24 and the fuel tank 22, and an abnormality (e.g., the opening of a hole) in the canister 24, the fuel tank 22, and peripheral components thereof can be detected, by driving the key-off pump 25. Besides, the key-off pump 25 may be configured to apply a negative pressure to the canister 24 and the fuel tank 22. Incidentally, in the present embodiment of the disclosure, an in-vehicle failure diagnosis module (a so-called OBD module) 26 is constituted by the key-off pump 25, the aforementioned changeover valve, the housing 26A, a communication passage (not shown) that is formed in the housing 26A to establish communication between the ventilation port 24A and the filter case 60, and the like.

Besides, the housing 26A is provided with an insertion portion 26B. A first tubular portion 62 of the filter unit 30 that will be described later is inserted into this insertion portion 26B. An annular groove 26C that is continuous in a circumferential direction thereof is formed in an inner peripheral surface of the insertion portion 26B. An annular water shutoff member 27 (an O-ring in the present embodiment of the disclosure) is inserted in this groove 26C. Then, when the first tubular portion 62 is inserted into the insertion portion 26B, the inner peripheral surface of the water shutoff member 27 is closely fitted to an outer peripheral surface of the first tubular portion 62.

Besides, the housing 26A is provided with a pair of flexible plates 52 that extend toward the filter unit 30 and that sandwich the filter case 60, which will be described later, from both sides thereof. These flexible plates 52 are provided with hole portions 54 into which later-described protrusion portions 66 of the filter case 60 can be inserted, respectively, with the first tubular portion 62 inserted in the insertion portion 26B. Incidentally, each of the hole portions 54 according to the present embodiment of the disclosure is an example of the engaged portion in the disclosure.

(Atmosphere Communication Pipe 28)

The atmosphere communication pipe 28 is a pipeline that extends from an atmosphere opening port 56 that opens to the outside toward the ventilation port 24A of the canister 24. Incidentally, in the present embodiment of the disclosure, the atmosphere opening port 56 is provided around the fuel feed port 32A of the inlet pipe 32.

(Filter Unit 30)

Figure 2:
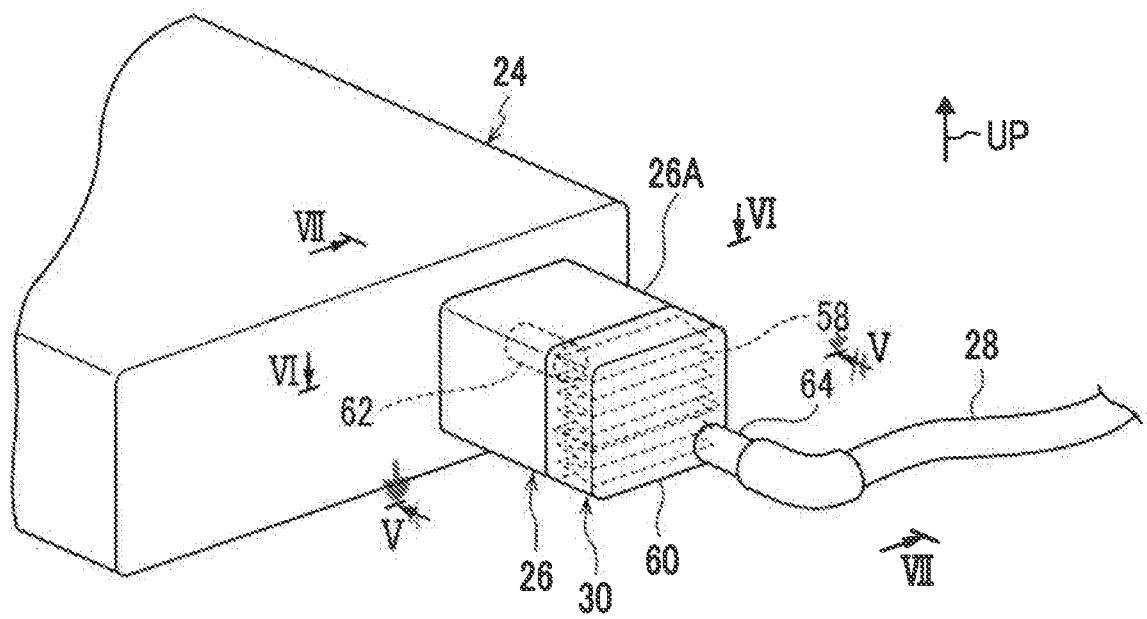
FIG. 2 is a perspective view showing a state where a housing, a filter unit, and an atmosphere communication pipe are attached to a canister shown in FIG. 1.
Figure 3:
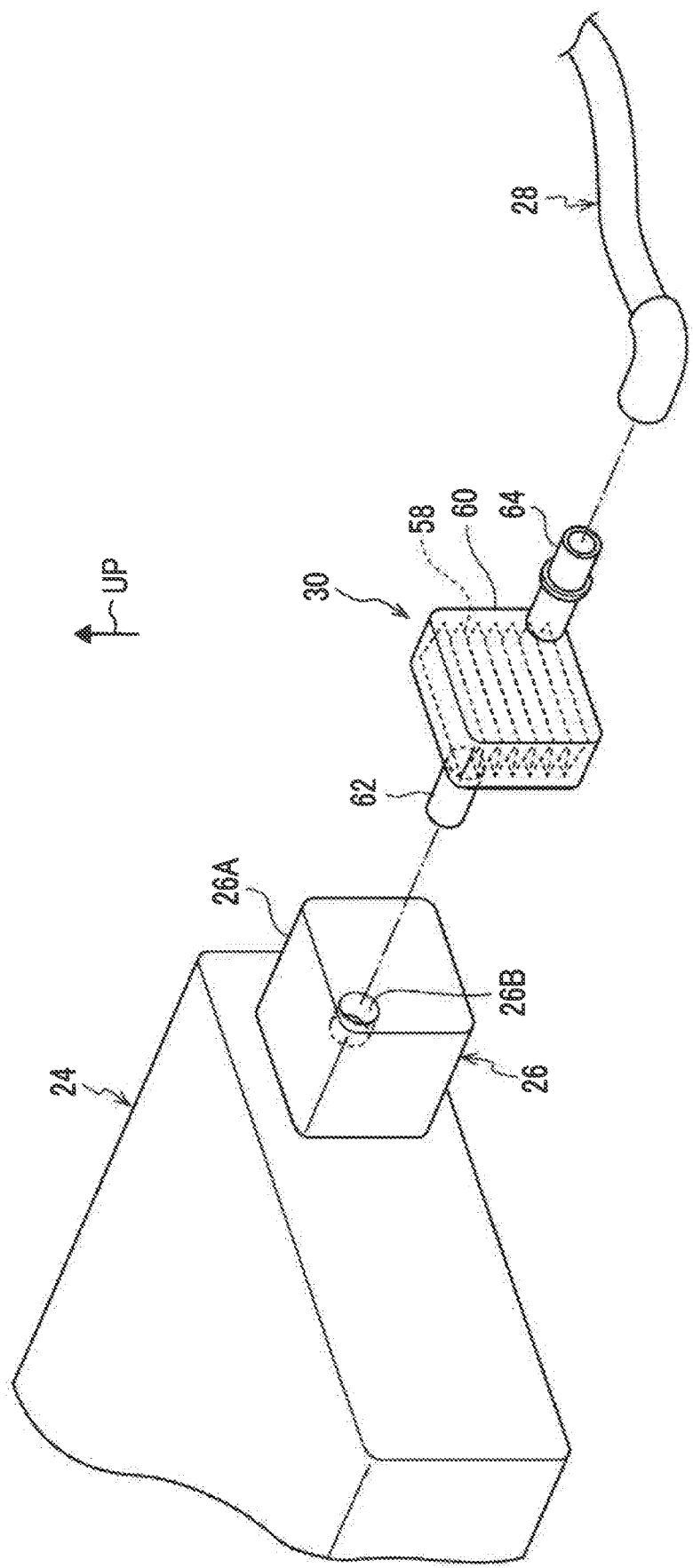
FIG. 3 is an exploded perspective view of FIG. 2.
Figure 7:
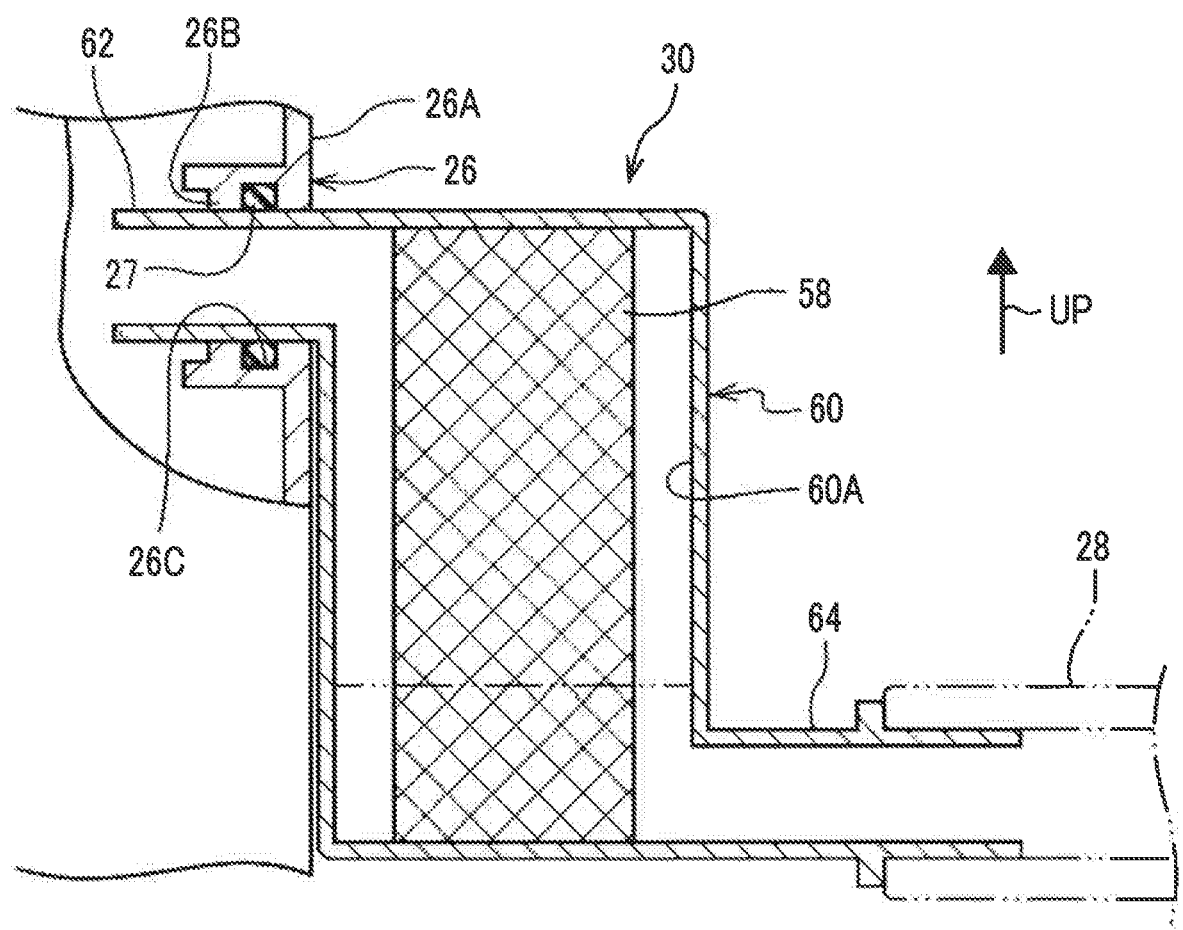
FIG. 7 is a cross-sectional view taken along a line VII-VII of FIG. 2.

As shown in FIGS. 2 and 3, the filter unit 30 is removably fitted to the housing 26A and the atmosphere communication pipe 28, and is configured to establish communication between the housing 26A and the atmosphere communication pipe 28 via an internal space 60A (see FIGS. 5 and 7) in which an air filter 58 is arranged. In concrete terms, the filter unit 30 is equipped with the air filter 58, the filter case 60, the first tubular portion 62, and a second tubular portion 64.

The air filter 58 is a filter that removes foreign matters from the atmosphere that is introduced thereinto from the atmosphere opening port 56 through the atmosphere communication pipe 28.

Figure 4:
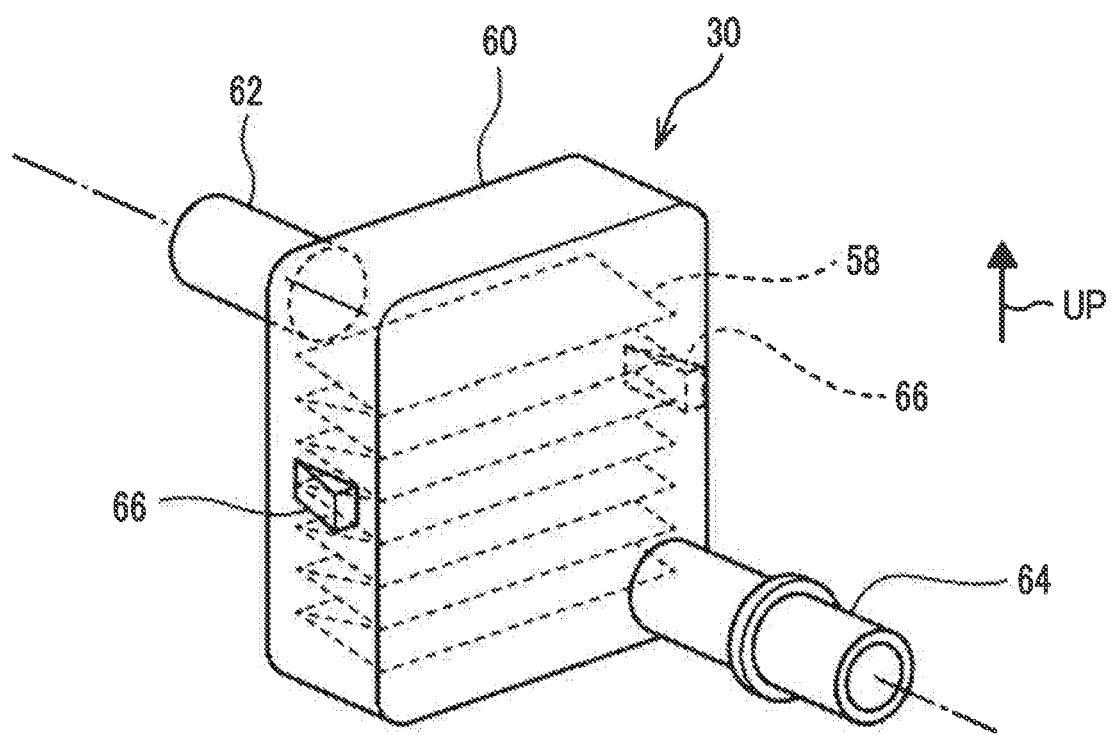
FIG. 4 is a perspective view of the filter unit shown in FIG. 1.

As shown in FIG. 4, the filter case 60 is a rectangular box-shaped case, and is formed of a resinous material or the like. Besides, the air filter 58 is arranged in the internal space 60A of the filter case 60.

The first tubular portion 62 assumes the shape of a cylinder, and is provided in a protruding manner on the filter case 60. This first tubular portion 62 can be inserted into the insertion portion 26B that is formed through the housing 26A. Upon being inserted into the insertion portion 26B, the first tubular portion 62 establishes communication between the housing 26A and the filter case 60.

The second tubular portion 64 assumes the shape of a cylinder, and is provided in a protruding manner on the filter case 60. Incidentally, in the present embodiment of the disclosure, the second tubular portion 64 and the first tubular portion 62 are provided on opposite surfaces of the filter case 60 respectively. This second tubular portion 64 can be inserted into an end portion of the atmosphere communication pipe 28. Upon being inserted into the end portion of the atmosphere communication pipe 28, the second tubular portion 64 establishes communication between the atmosphere communication pipe 28 and the filter case 60. Incidentally, in the present embodiment of the disclosure, the end portion of the atmosphere communication pipe 28 is constituted by an elbow joint (see FIGS. 2 and 3). Owing to the aforementioned configuration, with the first tubular portion 62 inserted in the insertion portion 26B and with the second tubular portion 64 inserted in the end portion of the atmosphere communication pipe 28, the housing 26A and the atmosphere communication pipe 28 are made to communicate with each other via the internal space 60A of the filter case 60.

Besides, the first tubular portion 62 is located above the second tubular portion 64 with respect to the vehicle. In concrete terms, the opening in the internal space 60A of the first tubular portion 62 is located above the opening in the internal space 60A of the second tubular portion 64, with respect to the vehicle.

Figure 6:
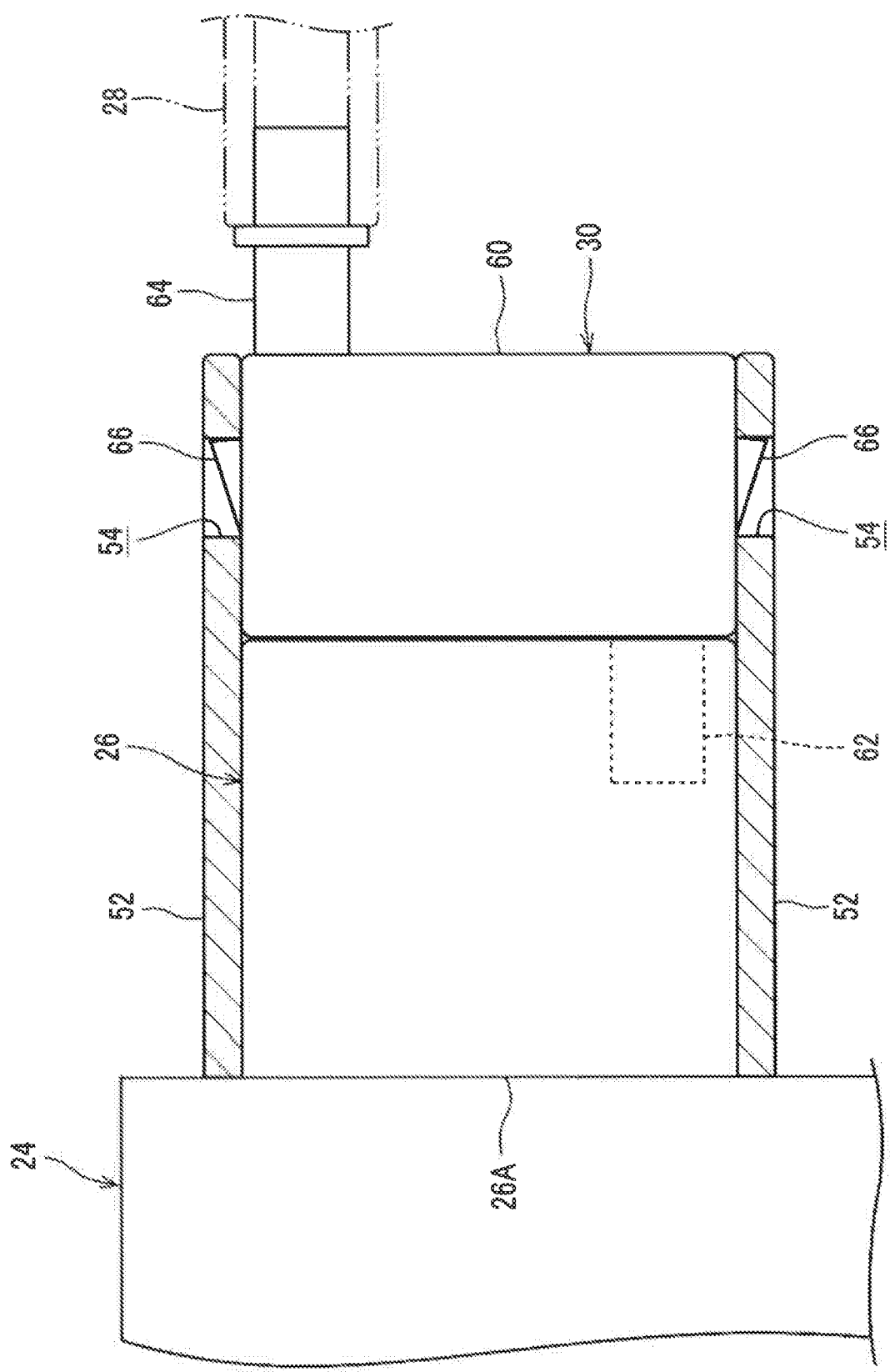
FIG. 6 is a cross-sectional view taken along a line VI-VI of FIG. 2.

Besides, as shown in FIG. 6, the filter case 60 is provided with the protrusion portions 66 that are inserted into the hole portions 54 of the pair of the flexible plates 52 respectively. These protrusion portions 66 protrude in opposite directions from both lateral surfaces of the filter case 60 that are opposed to each other. It should be noted herein that with the first tubular portion 62 inserted in the insertion portion 26B, the protrusion portions 66 of the filter case 60 inserted between the pair of the flexible plates 52 are inserted into the hole portions 54 of the flexible plates 52 respectively. Incidentally, each of the protrusion portions 66 according to the present embodiment of the disclosure is an example of the engaging portion in the disclosure. Incidentally, the protrusion portions 66 are omitted in FIGS. 2, 3, and 5.

Next, the operation and effect of the present embodiment of the disclosure will be described. In the fuel tank system 20, an internal pressure can be applied to the canister 24 and to the fuel tank 22 via the canister 24, by driving the key-off pump 25 of the in-vehicle failure diagnosis module 26. The application of this internal pressure makes it possible to detect an abnormality (e.g., to detect the opening of a hole) at least in the canister 24 and the fuel tank 22.

Besides, in the fuel tank system 20, the housing 26A and the atmosphere communication pipe 28 communicate with each other via the internal space 60A of the filter unit 30. The air filter 58 is arranged in the internal space 60A of this filter unit 30. Therefore, foreign matters can be removed from the atmosphere that is introduced into the canister 24 from the atmosphere opening port 56 through the atmosphere communication pipe 28.

Also, in the fuel tank system 20, the filter unit 30 is removably fitted to the housing 26A and the atmosphere communication pipe 28. In replacing the air filter 58, the used filter unit 30 is separated (removed) from the housing 26A and the atmosphere communication pipe 28, and a new filter unit 30 is fitted (attached) to the housing 26A and the atmosphere communication pipe 28. Thus, the air filter 58 is replaced. It should be noted herein that the fuel tank system 20 makes it possible to separate (replace) only the filter unit 30 independently and hence to more easily replace the air filter 58 than, for example, in a configuration in which the filter unit 30 is fixed (irremovably fitted) to another vehicle component (the inlet pipe).

Besides, in the fuel tank system 20, the filter case 60 is provided with the first tubular portion 62 that is inserted into the insertion portion 26B of the housing 26A, and the second tubular portion 64 that is inserted into the end portion of the atmosphere communication pipe 28. Therefore, while ensuring a field in which the air filter 58 is arranged, the filter case 60 can be made smaller than in, for example, a configuration in which the filter case 60 is provided with a tubular portion that is provided on the housing 26A and an insertion portion into which the end portion of the atmosphere communication pipe 28 is inserted respectively.

Furthermore, in the fuel tank system 20 with the first tubular portion 62 inserted in the insertion portion 26B, the protrusion portions 66 of the filter case 60 are inserted in (engaged with) the hole portions 54 of the flexible plates 52 respectively to limit the movement of the first tubular portion 62, namely, to fit the filter unit 30 to the housing 26A. It should be noted herein that the fuel tank system 20 makes it possible to easily fit the filter unit 30 to the housing 26A, because the protrusion portions 66 and the hole portions 54 are engaged with each other respectively by inserting the first tubular portion 62 into the insertion portion 26B.

In particular, in the fuel tank system 20, the filter case 60 is inserted into the space between the pair of the flexible plates 52, and is moved with the pair of the flexible plates 52 pressed and flexed outward (in a direction in which the pair of the flexible plates 52 are spaced apart from each other) by the protrusion portions 66 on both sides thereof respectively. Therefore, when the protrusion portions 66 reach the hole portions 54 of the flexible plates 52 and are inserted into the hole portions 54 respectively, the flexible plates 52 return to their original state, and the filter unit 30 is fitted to the housing 26A with the filter case 60 sandwiched from both the sides thereof. Besides, the filter unit 30 is separated (removed) from the housing 26A, by taking out the filter case 60 from the space between the pair of the flexible plates 52 with the flexible plates 52 flexed outward to cause the protrusion portions 66 to slip out of the hole portions 54 respectively. As described hitherto, the fuel tank system 20 makes it possible to easily attach/separate the filter case 60 of the filter unit 30 to/from the housing 26A, with a simple configuration in which the hole portions 54 that are provided through the pair of the flexible plates 52 of the housing 26A and the protrusion portions 66 that are provided on the filter case 60 are used.

Besides, in the fuel tank system 20, the first tubular portion 62 is located above the second tubular portion 64 with respect to the vehicle. Thus, the liquid (water or the like) that has entered the interior of the atmosphere communication pipe 28 from the atmosphere opening port 56 can be temporarily stored in the internal space 60A of the filter case 60. Therefore, in the fuel tank system 20, the liquid that has entered the interior of the atmosphere communication pipe 28 from the atmosphere opening port 56 can be more effectively restrained from flowing into the key-off pump 25 of the housing 26A through the first tubular portion 62 than in, for example, a configuration in which the first tubular portion 62 is located at the same position as the second tubular portion 64 in a vertical direction of the vehicle or below the second tubular portion 64 with respect to the vehicle.

Figure 8:
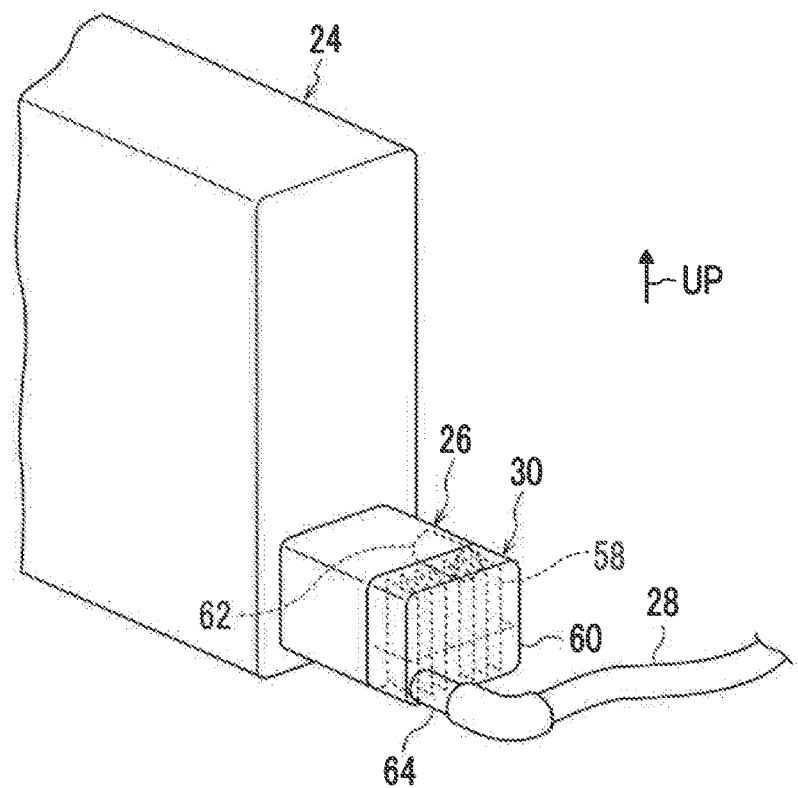
FIG. 8 is a perspective view showing a state where a housing, a filter unit, and an atmosphere communication pipe are attached to a canister of a fuel tank system according to another one of the embodiments of the disclosure (a perspective view corresponding to FIG. 2)

In the foregoing embodiment of the disclosure, the canister 24 is horizontally placed, but the disclosure is not limited to this configuration. As shown in FIG. 8, the canister 24 may be vertically placed. That is, the disclosure makes it possible to enhance the degree of freedom in the orientation of the canister 24 when the canister 24 is mounted in the vehicle.

Figure 9:
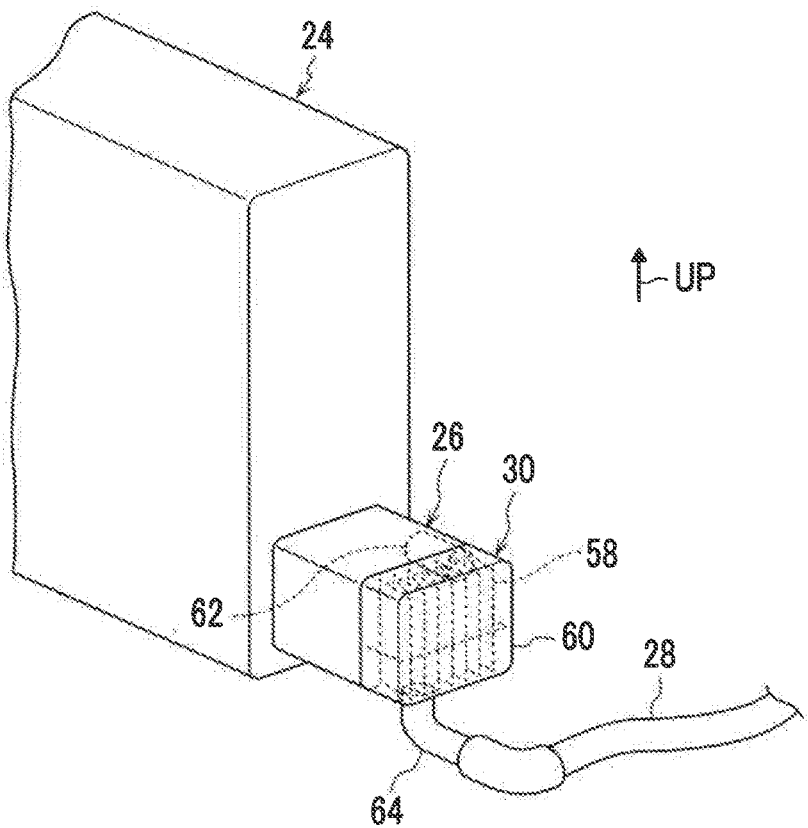
FIG. 9 is a perspective view showing a state where a housing, a filter unit, and an atmosphere communication pipe are attached to a canister of a fuel tank system according to still another one of the embodiments of the disclosure (a perspective view corresponding to FIG. 2)

Besides, in the foregoing embodiment of the disclosure, the first tubular portion 62 and the second tubular portion 64 are protruded from the opposite surfaces of the filter case 60, but the disclosure is not limited to this configuration. For example, as shown in FIG. 9, it is also appropriate to adopt a configuration in which the second tubular portion 64 is protruded from a lower surface of the filter case 60.

Figure 10:
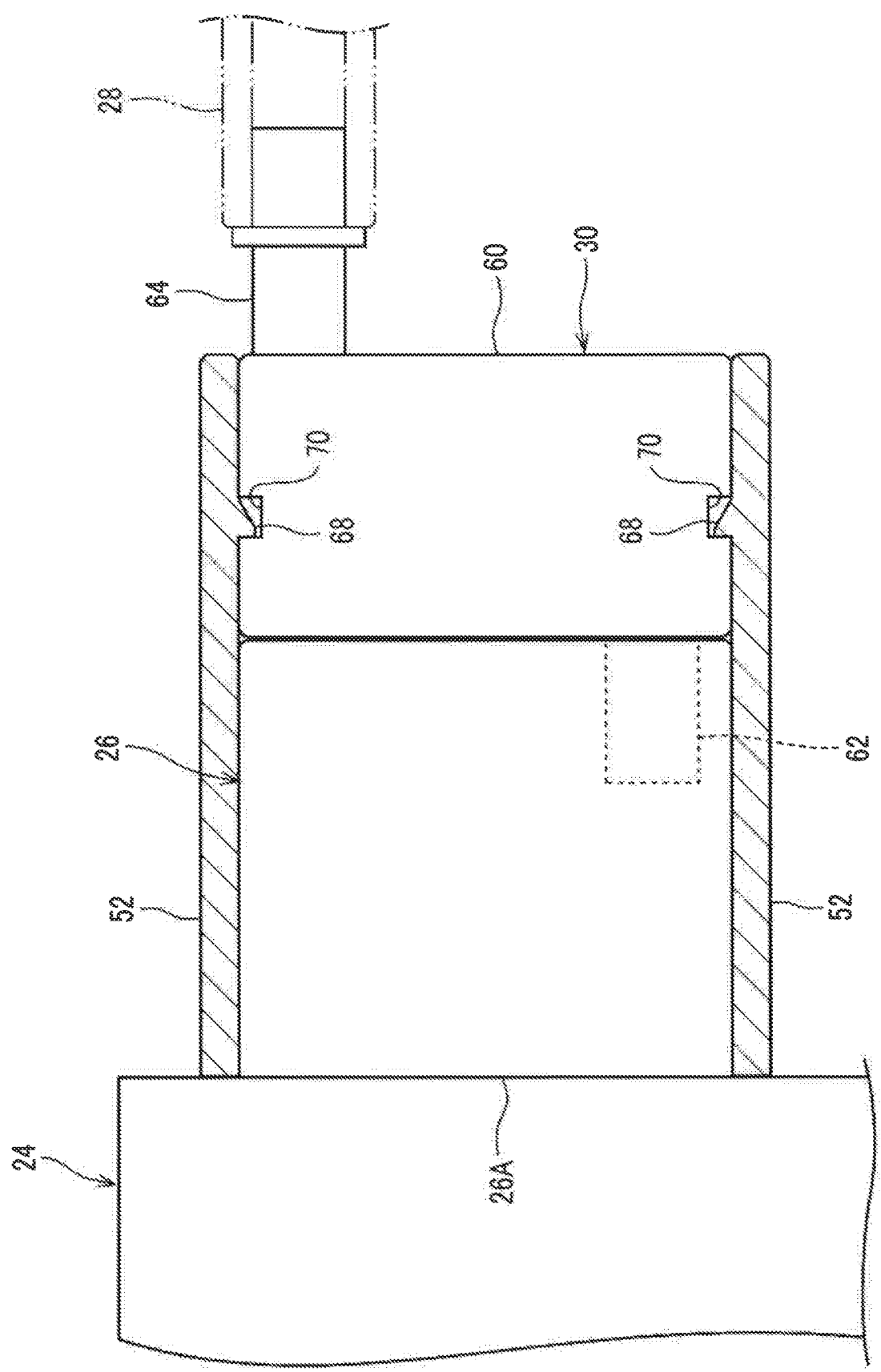
FIG. 10 is a partially cross-sectional plan view showing a state where a housing, a filter unit, and an atmosphere communication pipe are attached to a canister of a fuel tank system according to still another one of the embodiments of the disclosure (a cross-sectional view corresponding to FIG. 6).

Furthermore, the foregoing embodiment of the disclosure adopts the configuration in which the pair of the flexible plates 52 are provided with the hole portions 54 respectively and the filter case 60 is provided with the pair of the protrusion portions 66, but the disclosure is not limited to this configuration. For example, as shown in FIG. 10, it is also appropriate to adopt a configuration in which inwardly protruding claw portions 68 are provided at tip portions 52A of the flexible plates 52 respectively and recess portions 70 into which the claw portions 68 are inserted are provided in both the lateral surfaces of the filter case 60 respectively.

Still further, in the foregoing embodiment of the disclosure, the first tubular portion 62 is located above the second tubular portion 64 with respect to the vehicle, but the disclosure is not limited to this configuration. For example, if the filter case is provided with a region for storing the liquid (water or the like) that has entered the space between the first tubular portion 62 and the second tubular portion 64 from the atmosphere communication pipe 28, the first tubular portion 62 and the second tubular portion 64 may be set at the same position in the vertical direction of the vehicle. Incidentally, the aforementioned region for storing the liquid is also applicable to the configuration in which the first tubular portion 62 is located above the second tubular portion 64 with respect to the vehicle.

In the foregoing embodiment of the disclosure, when the air filter 58 is replaced, the used filter unit 30 is replaced with the new filter unit 30, but the disclosure is not limited to this configuration. For example, it is also appropriate to adopt a configuration in which when the air filter 58 is replaced, the filter unit 30 is separated from the housing 26A and the atmosphere communication pipe 28, the filter case 60 is disassembled to replace the used air filter 58 with a new air filter 58, and then the filter unit 30 with its air filter replaced is fitted again to the housing 26A and the atmosphere communication pipe 28.

Although one of the embodiments of the disclosure has been described above, the disclosure is not limited to the foregoing, but can be obviously carried out after being subjected to various modifications other than the foregoing within such a range as not to depart from the scope of the disclosure.

What is claimed is:

1. A fuel tank system comprising:
    a fuel tank configured to store fuel;
    a canister that has a ventilation port and an introduction port and that accommodates an adsorbent, the adsorbent being configured to absorb evaporative fuel introduced into the canister from the fuel tank through the introduction port;
    a housing attached to the canister, the housing accommodating a pump configured to apply a pressure to an interior of the canister through the ventilation port;
    a pipeline that has an atmosphere opening port opening to an outside, the pipeline extending from the atmosphere opening port toward the ventilation port;
    a filter unit having a case defining an internal space and an air filter arranged within the case, the case of the filter unit being separate from and removably fitted to both: (i) the housing and (ii) the pipeline, the housing and the pipeline communicating with each other via the internal space;
    a first tubular portion provided in the case, the first tubular portion establishing communication between the housing and the case by being inserted into an insertion portion provided through the housing; and
    a second tubular portion provided in the case, the second tubular portion establishing communication between the pipeline and the case by being inserted into an end portion of the pipeline; wherein
    the case is provided with an engaging portion, and
    the housing is provided with an engaged portion configured to be engaged with the engaging portion in a condition that the first tubular portion is inserted in the insertion portion.

2. The fuel tank system according to claim 1, wherein
    the engaging portion is configured as a pair of protrusion portions that protrude in opposite directions from both lateral walls of the case, the lateral walls being opposed to each other, and
    the engaged portion is configured as hole portions extending from the housing toward the case, the hole portions being provided through a pair of flexible plates sandwiching the case from both sides of the case, the hole portions allowing the protrusion portions to be inserted into the hole portions, respectively.

3. The fuel tank system according to claim 1, wherein
    the first tubular portion is located above the second tubular portion in a vertical direction of a vehicle.

* * * * *